(12) United States Patent
Ono et al.

(10) Patent No.: US 6,680,004 B2
(45) Date of Patent: Jan. 20, 2004

(54) METHOD OF PRODUCING ALUMINATE FLUORESCENT SUBSTANCE, A FLUORESCENT SUBSTANCE AND A DIODE CONTAINING A FLUORESCENT SUBSTANCE

(75) Inventors: Keiji Ono, Tsukuba (JP); Susumu Miyazaki, Kitasoma-gun (JP)

(73) Assignee: Sumitomo Chemical Company Limited, Osaka (JP)

( * ) Notice: Subject to any disclaimer, the term of this patent is extended or adjusted under 35 U.S.C. 154(b) by 47 days.

(21) Appl. No.: 09/885,960

(22) Filed: Jun. 22, 2001

(65) Prior Publication Data

US 2001/0054708 A1 Dec. 27, 2001

(30) Foreign Application Priority Data

Jun. 27, 2000 (JP) ........................................ 2000-192349
Sep. 12, 2000 (JP) ........................................ 2000-276134

(51) Int. Cl.⁷ .......................... C09K 11/64; C09K 11/55
(52) U.S. Cl. ............................................... 252/301.4 R
(58) Field of Search ................................. 252/301.4 R

(56) References Cited

U.S. PATENT DOCUMENTS

| 4,840,747 | A |   | 6/1989 | Fan et al. |  |
| 2002/0088963 | A1 | * | 7/2002 | Ono et al. | ............ 252/301.4 R |
| 2002/0179886 | A1 | * | 12/2002 | Kumar | ................ 252/301.4 R |

FOREIGN PATENT DOCUMENTS

| DD | 226 899 A |   | 9/1985 |
| JP | 10-53760 | * | 2/1998 |
| JP | 10-53762 | * | 2/1998 |

OTHER PUBLICATIONS

Derwent Patent Abstract corresponding to JPA No. 2000–34480.
Derwent Patent Abstract corresponding to JPA No. 7–206430.
Derwent Patent Abstract corresponding to JPA No. 10–195428.
Abstract, XP–002243426, Section Ch, Week 199845, Derwent Publications Ltd, London, GB, Class L03, AN 1998–531984.
Abstract, XP–002243427, Section Ch, Week 200038, Derwent Publications Ltd., London, GB, Class L02, AN 2000–436467.

* cited by examiner

*Primary Examiner*—C. Melissa Koslow
(74) *Attorney, Agent, or Firm*—Sughrue Mion, PLLC

(57) ABSTRACT

A method of producing an aluminate fluorescent substance, a fluorescent substance and a device containing a fluorescent substance. The method includes the steps of mixing an α-alumina powder having an average primary particle size of from about 0.05 μm to less than 0.3 μm with a metal salt, and calcining the resulting mixture.

15 Claims, No Drawings

METHOD OF PRODUCING ALUMINATE FLUORESCENT SUBSTANCE, A FLUORESCENT SUBSTANCE AND A DIODE CONTAINING A FLUORESCENT SUBSTANCE

FIELD OF THE INVENTION

The present invention relates to an aluminate fluorescent substance used in various types of light emission displays such as a plasma display panel (hereinafter, referred to as "PDP" and the like, and vacuum ultraviolet ray-excited, light-emitting diodes such as a rare gas lamp and the like, and a method of producing an aluminate fluorescent substance for use as a luminous material, which substance is excited by ultraviolet ray or visible light and exhibits afterglow for a long period of time.

BACKGROUND OF THE INVENTION

Recently, there are wide-spread developments of vacuum ultraviolet ray-excited, light-emitting diodes having a mechanism in which a fluorescent substance is excited by vacuum ultraviolet ray radiated by rare gas discharge to emit light, and development of PDPs is a typical example thereof. A PDP enables increase in size of an image plane which is difficult to achieve in cathode-ray tubes (CRT) and color liquid crystal displays, and are expected to be used for flat panel displays in public spaces or as a large screen television. A PDP is a display device obtained by placing a large number of fine discharging spaces (hereinafter, sometimes abbreviated as display cell) into a matrix arrangement. A discharge electrode is provided in each display cell and a fluorescent substance is applied on the inner wall of each display cell. Each display cell is filled with a rare gas such as He—Xe, Ne—Xe, Ar and the like, and by applying voltage on a discharge electrode, discharge occurs in the rare gas and vacuum ultraviolet ray are radiated. The fluorescent substance is excited by the vacuum ultraviolet ray and emits visible ray. Images are displayed by controlling the positions of display cells which emit light. By use of fluorescent substances emitting three primary colors, blue, green and red, full color display can be achieved.

A vacuum ultraviolet ray-excited light-emitting device other than a PDP is a rare gas lamp. A rare gas lamp emits light by a mechanism in which vacuum ultraviolet ray are generated by discharge in a rare gas, and the vacuum ultraviolet ray is converted into visible ray by a fluorescent substance. Rare gas lamps are advantageous from an environmental standpoint because they do not use mercury.

Aluminate fluorescent substances excited by vacuum ultraviolet ray radiated by discharge in a rare gas are known. As a blue light-emitting fluorescent substance, compounds using as a substrate a complex oxide of the composition formula $x^1M^1O \cdot y^1MgO \cdot z^1Al_2O_3$, and containing Eu as an activator are known, and as typical examples thereof, compounds in which $M^1$ is Ba ($BaMgAl_{10}O_{17}$:Eu, $BaMgAl_{14}O_{23}$:Eu, and the like) are known.

As a green light-emitting fluorescent substance, compounds using as a substrate a complex oxide of the composition formula $x^1M^1O \cdot y^1MgO \cdot z^1Al_2O_3$, and containing Mn as an activator are known, and as typical examples thereof, compounds in which $M^1$ is Ba ($BaAl_{12}O_{19}$:Mn, $BaMgAl_{14}O_{23}$:Mn, and the like) are known.

An aluminate fluorescent substance can be obtained, in general, by mixing compounds containing metal elements constituting the intended aluminate fluorescent substance in such a proportion as to form the intended aluminate fluorescent substance, and calcining the mixture in, for example, a reduction atmosphere. For example, an aluminate fluorescent substance of the composition formula: $Ba_{0.9}Eu_{0.1}MgAl_{10}O_{17}$ can be produced by mixing a barium compound, europium compound, magnesium compound and aluminum compound so that Ba:Eu:Mg:Al= 0.9:0.1:1:10, and calcining the produced mixture, for example, in an atmosphere containing hydrogen.

When a display cell such as a PDP and the like is produced using such an aluminate fluorescent substance, high light emitting brilliance is required. A fluorescent substance used in conventional display cells such as a PDP and the like has a primary particle size of about 2 to 5 $\mu$m, and is applied on the rear plate side of a display cell, namely, on a side surface and bottom surface of a display cell. Recently, it is required to apply a fluorescent substance particle not only on a side surface and bottom surface of a display cell in a PDP but also on the front plate side, namely, the top surface of a display cell, for further increasing light emitting brilliance of the PDP.

Further, a self-emitting luminous material having a mechanism in which a radiation substance is added to a fluorescent substance is conventional, and has been used for a nocturnal display or as a luminous clock. In these types of devices, light emission is caused by exciting the fluorescent substance by weak radiation generated from a trace amount of the radiation substance. Recently, fluorescent substances containing no radioactive substances have been studied for use as luminous material. These substances preserve day light and can emit light for a long period even at night, have excellent light emitting efficiency, and high after glow brilliance. Such a fluorescent substance includes, for example, strontium aluminate ($SrAl_2O_4$:Eu, etc.) and the like.

JP-A No. 2000-34480, for example, discloses "alkaline earth metal aluminate luminous fluorescent substance activated with a divalent europium, having a chemical composition $RO \cdot a(Al_{1-x}Ga_x)_2O_3 \cdot bM_mO_n \cdot cB_2O_3 \cdot dEu^{2+}$ (wherein, R represents one or more metals selected from the alkaline earth metals such as Ba, Sr, Ca, Mg and the like, and Zn, and M represents Y, Sc and/or Si), in which $0.3 \leq a \leq 8$, $0 \leq b \leq 0.2$, $0.001 \leq c \leq 0.3$, $0.001 \leq d \leq 0.3$, $0 \leq x \leq 1.0$)" and describes that "afterglow brilliance and afterglow time can be simultaneously improved" . . . "by inclusion of at least one or more oxides selected from yttrium oxide, scandium oxide and silicon oxide". However, there is a desire for further improvement in afterglow brilliance.

SUMMARY OF THE INVENTION

An object of the present invention is to provide a method of producing an aluminate fluorescent substance having a particle size suitable for various light emission type displays such as a PDP and the like, and vacuum ultraviolet ray-excited light emitting devices such as rare gas lamp and the like, and the displays and devices having high light emitting brilliance, an aluminate fluorescent substance obtained by this method, a fluorescent substance for a vacuum ultraviolet ray-excited light emitting device having this aluminate fluorescent substance, and a ultraviolet ray-excited light emitting device having this fluorescent substance.

Another object of the present invention is to provide an aluminate fluorescent substance for luminous material, the substance having high afterglow brilliance and being suitable for use in a luminous material.

These objects and another objectives are achieved by the present invention. Namely, the present invention provides a method of producing an aluminate fluorescent substance comprising the steps of mixing an α-alumina powder having an average primary particle size of from about 0.05 µm to less than 0.3 µm with a metal salt, and calcining the resulting mixture. Further, the present invention provides a fluorescent substance for a vacuum ultraviolet ray-excited light emitting device, comprising 80 wt % or more of an aluminate fluorescent substance obtained by the above-mentioned production method and having a primary particle size of from about 0.05 µm to less than about 0.3 µm.

As used herein, the term "average primary particle size" is a number-average value of particle sizes read from a picture photographed by a scanning electron microscope.

DETAILED DESCRIPTION OF THE INVENTION

The present invention will be illustrated in detail below.

In the method of producing an aluminate fluorescent substance of the present invention, the average primary particle size of an α-alumina powder used is from about 0.05 µm to less than 0.3 µm, and preferably from about 0.07 µm to about 0.28 µm or less, further preferably from about 0.1 µm to about 0.25 µm or less. When the average primary particle size is less than 0.05 µm, synthesis of an aluminate fluorescent substance may be difficult, and when it is more than 0.3 µm, an aluminate fluorescent substance containing ions having excellent dispersion uniformity may not be produced easily, and the transmittance of an aluminate fluorescent substance may decrease. Therefore, an aluminate fluorescent substance having such average primary particle outside the present invention may not be suitable, particularly, for use in which a fluorescent substance layer is adhered to the front surface plate of a PDP.

As the α-alumina powder having a primary particle size within the present invention, for example, those obtained by classifying commercially available α-aluminas to provide given particle size distribution may be advantageously used. Further, an α-alumina powder having a particle size controlled in given primary particle size system by a production method described in JP-A No. 7-206430, for example, by a method to control particle size by adding a seed crystal, may also be used.

The above-mentioned average primary particle size can be measured by image-analyzing a picture of a powder photographed by using a scanning electron microscope.

The α-alumina powder used in the present invention preferably has a purity of about 99.9 wt % or more from the standpoint of increase in brilliance of the resultant aluminate fluorescent substance.

Further, in general, a coarse particle is ground to obtain an α-alumina powder having a smaller particle size, and then may be used in various productions process. Therefore, a primary particle of such α-alumina powder after grinding usually has a "fractured surface". However, when an α-alumina powder having such a fractured surface is used, coagulation may occur during calcination, the primary particle size of the finally resulted aluminate fluorescent substance may increase, which may be undesirable depending on ultimate uses.

Therefore, the α-alumina powder used in the present invention preferably is an α-alumina powder having substantially no fractures on the surface thereof. As used herein, the term "having substantially no fracture surface" is intended to mean an amount of fractures on the surface of the particles such that there is no coagulation in a calcinations process and the like, which can be Judged by image analysis from a SEM photograph of an α-alumina powder used.

A method of producing an α-alumina powder as disclosed in for example, JP-A No. 7-206430 can be used to prepare α-alumina powder suitable for use in the present invention. Other methods will be apparent to one skilled in the art.

As the metal in metal salts used in the present invention, metals other than aluminum are used, including, magnesium, calcium, strontium, barium, scandium, yttrium, titanium, zirconium, hafnium, vanadium, niobium, tantalum, manganese, copper, silver, gold, zinc, cadmium, boron, gallium, indium, thallium, carbon, silicon, germanium, tin, lead, nitrogen, phosphorus, arsenic, antimony, bismuth, lanthanum, cerium, praseodymium, neodymium, samarium, europium, gadolinum, terbium, dysprosium, holmium, erbium, thulium, ytterbium, lutetium and the like are listed.

The metal salt used in the present invention means a salt of the above-mentioned metals, and those which are decomposed at higher temperature to become oxides, such as, for example, hydroxides, carbonates, nitrates, halides, oxalates and the like may be used, and oxides of these metals may be used.

The metal salts may be used alone or in combinations of two or more, and preferably are used in combinations of two or more.

Preferably, at least one barium salt, strontium salt and calcium salt, at least one europium salt and manganese salt, and a magnesium salt, are used in combination as the metal salt.

Further, for producing an aluminate fluorescent substance for use as a luminous material, at least one strontium salt and calcium salt, a europium salt, and at least one dysprosium salt and neodymium salt are preferably used in combination as the metal salt, and further, at least one lead salt, zinc salt and bismuth salt may also be added.

The above-mentioned metal salts may advantageously be mixed, for example, with an α-alumina powder in a ratio so that a specific composition ratio of an aluminate fluorescent substance described later is obtained.

In the above-mentioned process of mixing an α-alumina powder and a metal salt, any suitable method now known or developed in the future may be utilized, and for example, mixing methods using a ball mill, V-shape mixer, and stirring apparatus and the like, may be utilized.

The order of feeding an α-alumina powder and a metal salt to a mixer is not particularly restricted, and both of them may be fed simultaneously, fed separately, or they may be fed according to a master batch mode.

After an α-alumina powder and a metal salt are mixed by the above-mentioned method, the resulting mixture is calcined. The calcinations method and calcinations time can be suitably set for optimum conditions depending on the amounts and ratio of an α-alumina powder and metal salt used, and the ability of the particular calcination apparatus utilized, and the like. A desirable fluorescent substance in accordance with the present invention can be obtained by calcination at temperatures from about 900° C. to about 2000° C. for several hours to tens of hours. When a metal salt which can be decomposed at higher temperature to become an oxide such as a hydroxide, carbonate, nitrate, halide, oxalate and the like is used, calcination may be effected in two stages including a so-called pre-calcination/main-calcination in which pre-calcination is conducted at temperatures from about 600° C. to about 800° C., then, calcination is further conducted at a given temperature. In calcination, the condition of the gas atmosphere such as an air atmosphere, oxygen atmosphere, reduction atmosphere and the like, may advantageously be set depending on the intended aluminate fluorescent substance. For example, a mixture obtained in a mixing process can be placed in an alumina boat, and calcined at a given temperature in one of the above-mentioned gas atmospheres. Further, if necessary, by mixing a compound called a reaction promoter (flux) such as boron oxide, aluminum fluoride and the like into a mixture, a fluorescent substance having further excellent crystallinity and higher afterglow brilliance may be obtained in some cases.

More specifically, when a blue light emitting fluorescent substance ($BaMgAl_{10}O_{17}$:Eu, $BaMgAl_{14}O_{23}$:Eu, and the like) is produced in accordance with the present invention, it is preferable that an α-alumina powder and a metal salt in given amounts are mixed so as to give a metal composition ratio of this fluorescent substance and the resulted mixture is calcined once or more under a reduction atmosphere at a temperature from about 1000° C. to about 1700° C. for about 0.5 to about 50 hours. By repeating calcination-cooling to effect calcination twice or more, calcination unevenness disappears, and a fluorescent substance of more higher brilliance may be obtained. To obtain a reduction atmosphere, graphite may be placed into a boat filled with a mixture obtained in the mixing process, alternatively calcination may be conducted in a mixed atmosphere such as nitrogen and hydrogen, or a rare gas and hydrogen, and the like. Further, water vapor may also be contained in these atmospheres.

Further, when a green light emitting fluorescent substance ($BaAl_{12}O_{19}$:Mn, $BaMgAl_{14}O_{23}$:Mn, and the like) is produced, preferably calcination is repeated once or more under an air atmosphere or oxygen atmosphere at a temperature from about 1000 to about 1700° C. for about 0.5 to about 40 hours.

A fluorescent substance obtained by the production method of the present invention can be further subjected to a grinding process using a ball mill, jet mill and the like, and a washing process using water and the like, as a post process. If necessary, classification may also be conducted. For enhancing the crystallinity of the resulting aluminate fluorescent substance, re-calcination may also be conducted, if necessary.

The compositions of an aluminate fluorescent substance and an aluminate fluorescent substance for a luminous material obtained by the above-mentioned production differ depending on the kind and ratio of metal salts used, and the like. The following compositions are examples of compositions within the scope of the present invention.

(1) Aluminate fluorescent substances having as a substrate a complex oxide of the composition formula $x^1M^1O.y^1MgO.z^1Al_2O_3$ ($M^1$ represents at least one metal element selected from Ba, Sr and Ca) and containing Eu and/or Mn as an activator (preferably, $0.5 \leq x^1 \leq 4.5$, $0 \leq y^1 \leq 4$, $0.5 \leq z^1 \leq 20$) and $a^1$ and $b^1$ represent the contents of europium and manganese, respectively, depending on the desired color of the fluorescent substance and it is preferable that $a^1$ is from $0.01x^1$ or more to $0.15x^1$ or less and $b^1$ is from 0 or more to $0.15y^1$ or less.

(2) Aluminate fluorescent substances having as a substrate a complex oxide of the composition formula $x^{11}(Ba, Sr)O.y^{11}MgO.z^{11}Al_2O_3$ and containing Eu and/or Mn as an activator. (preferably, $0.9 \leq x^{11}-a^{11} \leq 1.7$, $1.5 \leq y^{11}-b^{11} \leq 2.1$, $z^{11}=8$. When, both of Ba and Sr are present, $x^{11}$ represents the total number of both metals. $a^{11}$ and $b^{11}$ represent the contents of Eu and Mn, respectively, and can vary depending on the desired color of the fluorescent substance, and it is preferable that $a^{11}$ is from $0.01x^{11}$ or more to $0.2x^{11}$ or less, and $b^{11}$ is from 0 or more to $0.15 y^{11}$ or less.).

(3) Aluminate fluorescent substances having as a substrate a complex oxide of the composition formula $x^{12}(Ba, Ca)O.z^{12}Al_2O_3$ and containing Eu and/or Mn as an activator. (preferably, $1.0 \leq x^{12}-a^{12} \leq 1.5$, and $z^{12}=6$. When both of Ba and Ca are present, $x^{12}$ represents the total number of both metals. $a^{12}$ and $b^{12}$ represent the contents of Eu and Mn, respectively, and can vary depending on the desired color of the fluorescent substance, and it is preferable that $a^{12}$ is from $0.01x^{12}$ or more to $0.15x^{12}$ or less, and the content of Mn, namely $b^{12}$ is from 0 or more to $0.20 x^{12}$ or less.)

(4) Aluminate fluorescent substances having as a substrate a complex oxide of the composition formula $x^{13}SrO.z^{13}Al_2O_3$ and containing Eu and/or Mn as an activator. (Preferably, $3.9 \leq x^{13}-a^{13}-b^{13} \leq 4.1$, and $z^{13}=7$. $a^{13}$ and $b^{13}$ represent the contents of Eu and Mn, respectively, and can vary depending on the desired color of the fluorescent substance, and it is preferable that $a^{13}$ is from $0.02x^{13}$ or more to $0.06x^{13}$ or less, and $b^{13}$ is from 0 or more to $0.1 x^{13}$ or less.)

(5) Aluminate fluorescent substances having as a substrate a complex oxide of the composition formula $x^2CeO_{1.5}.y^2M^2O.z^2Al_2O_3$ ($M^2$ represents Mg and/or Mn) and containing Tb and/or Mn as an activator. (preferably, $0.9 \leq x^2-a^2 \leq 1.1$, $0.9 \leq y^2-b^2 \leq 1.1$, $z^2=5.5$. $a^2$ and $b^2$ represent the contents of Tb and Mn, respectively, and can vary depending on the desired color of the fluorescent substance, and it is preferable that $a^2$ is from $0.3x^2$ or more to $0.5x^2$ or less, and $b^2$ is from 0 or more to $0.15 y^2$ or less.)

(6) Aluminate fluorescent substances for luminous material having as a substrate a complex oxide of the composition formula $x^3M^3O.Al_2O_3$ and containing Eu as a so-called activator and further containing Dy and/or Nd as a so-called co-activator. (Preferably, $M^3$ represents Sr and/or Ca, and $0.5 \leq x^3 \leq 1.1$. Further, when both of Sr and Ca are contained, $x^3$ is the total number of both metals.)

(7) Aluminate fluorescent substances for luminous material having as a substrate a complex oxide of the composition formula $x^{31}SrO.Al_2O_3$ and containing Eu as an activator and further containing Dy as a co-activator. (Preferably, $0.5 \leq x^{31}-a^{31}-b^{31} \leq 1.1$, more preferably $0.9 \leq x^{31}-a^{31}-b^{31} \leq 1.1$. $a^{31}$ and $b^{31}$ represent the contents of Eu and Dy, respectively, and can be set variously depending on the desired color of a fluorescent substance, and it is preferable that $a^{31}$ is $0.01x^{31}$ to $0.1x^{31}$, and $b^{31}$ is $0.02x^{31}$ to $0.2x^{31}$.

(8) Aluminate fluorescent substances for luminous material having as a substrate a complex oxide of the composition formula $x^{32}CaO.Al_2O_3$ and containing Eu as an activator and further containing Nd as a co-activator. (Preferably, $0.5 \leq x^{32}-a^{32}-b^{32} \leq 1.1$ more preferably $0.9 \leq x^{32}-a^{32}-b^{32} \leq 1.1$. $a^{32}$ and $b^{32}$ represent the contents of Eu and Nd, respectively, and can be set variously depending on the desired color of a fluorescent substance, and it is preferable that $a^{32}$ is from $0.01x^{32}$ to $0.1x^{32}$, and $b^{32}$ is from $0.02x^{32}$ to $0.2x^{32}$.)

When Pb, Zn or Bi is, in addition to an activator or co-activator, contained in the above-exemplified aluminate fluorescent substance for luminous material, afterglow brilliance may further increase in some cases. Therefore, it may be preferable to add a salt of Pb, Zn or Bi in the above-mentioned mixing process. Of the above-exemplified compounds, (1) to (5) have high light emission brilliance and can be preferably used for use as a PDP, and (6) to (8) have high afterglow brilliance and can be suitably used for use as a luminous material.

In the aluminate fluorescent substance obtained by the present invention, mutual coagulation between primary particles is weak and post processes such as grinding and the like can also be simplified.

Further, the aluminate fluorescent substance obtained by the above-mentioned method has smaller primary particle size than that of an aluminate fluorescent substance obtained by a usual method. Those containing particles having a primary particle size of from about 0.05 μm to less than about 0.3 μm in an amount of 80 wt % or more have excellent light emission efficiency and show high afterglow brilliance. Therefore, these can be suitably used for a vacuum ultraviolet ray-excited light emitting device or as a fluorescent substance for luminous material.

Such a fluorescent substance in accordance with the present invention is suitable for use for transmission of visible light. It can transmit visible light due to inclusion of particles having a particle size of from 0.05 μm to less than about 0.3 μm in an amount of about 80 wt % or more.

Since an aluminate fluorescent substance obtained by the method of the present invention contains coarse particles in a small amount, the fluorescent substance can be excited by energies in a wide range such as vacuum ultraviolet ray, ultraviolet ray, cathode ray, X ray and the like. Further it exhibits excellent light emission, and particularly, excellent light emission under excitation by vacuum ultraviolet ray. Therefore, an aluminate fluorescent substance obtained by the method of the present invention is extremely useful in various displays such as a PDP and the like and vacuum ultraviolet ray-excited light emitting devices such as a rare gas lamp and the like.

A PDP which is one example of a vacuum ultraviolet ray-excited light emitting device having an aluminate fluorescent substance obtained by the method of the present invention can be produced, for example, according to a method disclosed in JP-A No. 10-195428. Namely, aluminate fluorescent substances of blue, green or red may be mixed, for example, with a binder composed of a polymer such as a cellulose compound and polyvinyl alcohol, and with an organic solvent, to prepare a fluorescent substance paste. The prepared fluorescent substance paste may then be applied by a screen printing method and the like on the surface of a substrate in stripe form partitioned by partition walls and equipped with an address electrode on the inner surface of a PDP rear substrate and on the surface of the partition wall, and the paste may then be dried to form fluorescent substance layers of respective colors. A surface glass substrate equipped with a transparent electrode and bus electrode along a direction crossing the fluorescent substance layer and having an inner surface carrying thereon a dielectric substance layer and a protective layer provided may then be laminated and adhered to the formed layer, and a gas in the inner space may be exhausted and a rare gas of lower pressure such as Xe, Ne and the like may be sealed in the inner space to form an electric discharging space. Thus, a PDP can be produced.

A rare gas lamp which is one example of a vacuum ultraviolet ray-excited light emitting device other than a PDP is a lamp which emits light by a mechanism in which vacuum ultraviolet ray are generated by discharge in a rare gas, and the vacuum ultraviolet ray is converted into visible light by a fluorescent substance. The structure of a rare gas lamp is approximately the same as that of a PDP containing a small amount of display cells. In a fluorescent substance, white color is obtained by mixing three colors, which is different from the mechanism of a PDP. A rare gas lamp can be produced by approximately the same method as the above-mentioned method of producing a PDP.

EXAMPLES

The following examples illustrate the present invention further in detail, but they dot not limit the scope of the present invention. In the examples, an α-alumina powder produced according to a method disclosed in JP-A No. 7-206430, composed of particles having substantially no fractured surface, and having a purity of 99.99 wt % and an average primary particle size of 0.2 μm was used.

In the examples, the primary particle size and particle size of an α-alumina powder and aluminate fluorescent substance were measured by image-analyzing a picture of particles photographed by using a scanning electron microscope (JSM-T220 type, manufactured by JEOL Ltd.)

Example 1

7.23 g of an α-alumina powder having an average primary particle size of 0.2 μm, 2.52 g of barium carbonate, 0.25 g of europium oxide and 1.38 g of basic magnesium carbonate were mixed by a ball mill, and the resulted mixture was placed in an alumina boat, and calcined at 1450° C. for 2 hours in a weak reduction atmosphere composed of hydrogen 2 vol %-argon 98 vol %, to obtain a powder. The average particle size of the resulted powder was measured by utilizing a scanning electron micrograph, as a result, particle sizes of all particles were not more than 0.3 μm. The resulted powder had an average particle size of 0.2 μm. It was known that the resulted powder was a powder of an aluminate fluorescent substance of blue light emission having a $BaMgAl_{10}O_{17}$:Eu single phase, by measurement of X-ray diffraction (small X ray diffraction apparatus: phase identification and evaluation by Ru-200 manufactured by RIGAKU K.K.).

This blue light emission fluorescent substance was irradiated with ultraviolet ray using an excimer 146 nm lamp (Ushio Inc.) in a vacuum chamber having an atmospheric pressure of 6.7 Pa ($5 \times 10^{-2}$ Torr), and the brilliance was measured by using a color brilliance meter (BM-7 type; manufactured by TOPCON). As a result, blue strong light emission was shown, and the light emission brilliance was 28.1 cd/$M^2$. Further, also when this fluorescent substance was excited with ultraviolet ray of 254 nm and 365 nm, blue light emission of high brilliance was shown in both cases.

Example 2

4.95 g of α-alumina having an average primary particle size of 0.2 μm, 13.73 g of strontium carbonate, 0.35 g of europium oxide and 0.90 g of dysprosium oxide were mixed in a ball mill, and placed in an alumina boat, and calcined at 1300° C. for 3 hours in a reduction atmosphere composed of hydrogen 2 vol %-argon 98 vol %, to obtain an aluminate fluorescent substance of the composition formula ($Sr_{0.93}$, $Eu_{0.02}$, $Dy_{0.05}$)O.$Al_2O_3$. The resulted powder had an average particle size of 0.2 μm. The afterglow brilliance of the fluorescent substance ($Sr_{0.93}$, $Eu_{0.02}$, $Dy_{0.05}$)O.$Al_2O_3$ was measured by a fluorescent spectrophotometer RF-5000 manufactured by Shimadzu Corp. A xenon lamp of 150 W was used as a light source, and the fluorescent substance was irradiated with excitation light having a wavelength of 393.6 nm for 1 minute, then, the shutter was closed, and 5 minutes after, the afterglow brilliance was measured. The resulted afterglow brilliance was higher by 20% than the afterglow brilliance of a commercially available strontium aluminate-based fluorescent substance for luminous material.

Comparative Example 1

A fluorescent substance powder was obtained in the same manner as in Example 2 except that an α-alumina powder having an average primary particle size of 0.7 μm was used, and irradiated with ultraviolet ray using an excimer 146 nm lamp (Ushio Inc.) in a vacuum chamber having an atmospheric pressure of 6.7 Pa (5×10$^{-2}$ Torr), to cause a light emission brilliance of 25.1 cd/m$^2$.

The invention having been thus described, it will be apparent that the some may be varied in many ways. Such variations are regard as being within the spirit and scope of the invention, and all such modifications as would be apparent to one skilled in the art are intended to be included within the scope of the following claims.

What is claimed is:

1. A method of producing an aluminate fluorescent substance, comprising the steps of mixing an α-alumina powder with a metal salt, the α-alumina powder having an average primary particle size of from about 0.05 μm to less than 0.3 μm, and calcining the resulting mixture.

2. The method of producing an aluminate fluorescent substance according to claim 1, wherein the α-alumina powder is an α-alumina powder having substantially no fractured surface.

3. The method of producing an aluminate fluorescent substance according to claim 1, wherein the α-alumina powder has a purity of about 99.9 wt % or more.

4. The method of producing an aluminate fluorescent substance according to claim 1, wherein the metal salt comprises at least one metal salt selected from the group consisting of a barium salt, a strontium salt and a calcium salt, and at least one metal salt selected from the group consisting of a magnesium salt, a europium salt and a manganese salt.

5. The method of producing an aluminate fluorescent substance according to claim 4, wherein said aluminate fluorescent substance comprises a substrate comprising complex oxide of the composition formula $x^1M^1O \cdot y^1MgO \cdot z^1Al_2O_3$ where $M^1$ represents at least one metal element selected from the group consisting of Ba, Sr and Ca, and, $0.5 \leq x^1 \leq 4.5$, $0 \leq y^1 \leq 4$, $0.5 \leq z^1 \leq 20$, and contains an activator selected from the group consisting of Eu and Mn and mixtures thereof.

6. The method of producing an aluminate fluorescent substance according to claim 5, wherein the metal salt comprises a magnesium salt and at least one metal salt selected from the group consisting of a barium salt, a strontium salt and a calcium salt, and the metal salt is mixed with an α-alumina powder at a ratio of $x^1:y^1:z^1$, wherein, $0.5 \leq x^1 4.5$, $0 \leq y^1 \leq 4$, $0.5 \leq z^1 \leq 20$, and $x^1$ represents, when two or more metal salts are used, the total amount thereof.

7. A method of producing an aluminate fluorescent substance which comprises a substrate comprising complex oxide of the composition formula $x^1M^1O \cdot y^1MgO \cdot z^1Al_2O_3$ where $M^1$ represents at least one metal element selected from the group consisting of Ba, Sr and Ca, comprising the steps of mixing an α-alumina powder with a metal salt, the α-alumina powder having an average primary particle size of from about 0.5 μm to less than 0.3 μm, and calcining the resulting mixture, wherein the metal salt comprises a magnesium salt, an europium salt, a manganese salt and at least one metal salt selected from the group consisting of a barium salt, a strontium salt and a calcium (Ca) salt, and said metal salt is mixed with an α-alumina powder at a ratio of $(x^1-a^1):(y^1-b^1)\ z^1:a^1:b^1$, wherein, $0.5 \leq x^1 \leq 4.5, 0 \leq y^1 \leq 4$, $0.5 \leq z^1 \leq 20$, $0.01x^1 \leq a^1 \leq 0.15x^1$, $0 \leq b^1 \leq 0.15y^1$, $a^1$ and $b^1$ represent the contents of europium and manganese, respectively, and $x^1$ represents, when two or more metal salts are used, the total amount thereof.

8. The method of producing an aluminate fluorescent substance according to claim 1, wherein said the metal salt comprises a cerium salt, a magnesium salt and at least one metal salt selected from the group consisting of a terbium salt and a manganese salt.

9. The method of producing an aluminate fluorescent substance according to claim 8, wherein said aluminate fluorescent substance comprises a substrate comprising a complex oxide of the composition formula $x^2CeO_{1.5} \cdot y^2MgO \cdot z^2Al_2O_3$, wherein, $0.9 \leq x^2 \leq 1.1$, $0.9 \leq y^2 \leq 1.1, z^2=5.5$, and contains an activator selected from the group consisting of Tb and Mn.

10. The method of producing an aluminate fluorescent substance according to claim 9 wherein a cerium salt, a magnesium salt, and an α-alumina powder are mixed at a ratio of $x^2:y^2:z^2$ (wherein, $0.9 \leq x^2 \leq 1.1$, $0.9 \leq y^2 1.1$, and $z^2=5.5$).

11. A method of producing an aluminate fluorescent substance which comprises a substrate comprising complex oxide of the composition formula $x^2CeO_{1.5} \cdot y^2MgO \cdot z^2Al_2O_3$, comprising the steps of mixing an α-alumina powder with a metal salt, the α-alumina powder having an average primary particle size of from about 0.5 μm to less than 0.3 μm, and calcining the resulting mixture, wherein the metal salt comprises a cerium salt, a magnesium salt, a terbium and a manganese salt, and said metal salt is mixed with an α-alumina powder at a ratio of $(x^2-a^2):(y^2-b^2):z^2:a^2:b^2$, wherein, $0.9 \leq x^2 \leq 1.1$, $0.9 \leq y^2 \leq 1.1$, $z^2=5.5$, $0.3x^2 \leq a^2 0.5x^2$, $0 \leq b^2 \leq 0.15y^2$ and $a^2$ and $b^2$ represent the contents of terbium and manganese, respectively.

12. The method of producing an aluminate fluorescent substance according to claim 1, wherein the metal salt comprises at least one metal salt selected from the group consisting of a strontium salt and a calcium salt, at least one metal salt selected from the group consisting of a dysprosium salt and a neodymium salt, and an europium salt.

13. The method of producing an aluminate fluorescent substance according to claim 12, wherein said aluminate fluorescent substance comprises a substrate comprising a complex oxide of the composition formula $x^3M^3O \cdot Al_2O_3$, where $M^3$ represents at least one of Sr and Ca, $0.5 \leq x^3 \leq 1.1$, and, when two or more metal salts are used, $x^3$ is the total number of them, Eu as an activator and a co-activator selected from the group consisting of dysprosium, neodymium and mixtures thereof.

14. The method of producing an aluminate fluorescent substance according to claim 13, wherein the metal salt comprises at least one metal salt selected from the group consisting of a strontium salt and a calcium (Ca) salt, and said metal salt is mixed with an α-alumina powder at a ratio of $x^3:1$, wherein, $0.5 \leq x^3 \leq 1.1$, and $x^1$ represents, when two or more metal salts are used, the total amount thereof.

15. The method of producing an aluminate fluorescent substance according to claim 1, wherein metal salt comprises an europium salt, at least one metal salt selected from the group consisting of a strontium salt and a calcium salt, at least one metal salt selected from the group consisting of a dysprosium salt and a neodymium salt, and at least one metal salt selected from a group consisting of a lead salt, a zinc salt and a bismuth salt.

* * * * *

UNITED STATES PATENT AND TRADEMARK OFFICE
CERTIFICATE OF CORRECTION

| | |
|---|---|
| PATENT NO. | : 6,680,004 B2 |
| APPLICATION NO. | : 09/885960 |
| DATED | : January 20, 2004 |
| INVENTOR(S) | : Keiji Ono and Susumu Miyazaki |

It is certified that error appears in the above-identified patent and that said Letters Patent is hereby corrected as shown below:

In claim 7, at column 9, line 54, delete "0.5" and insert --0.05--.

In claim 11, at column 10, line 24, delete "0.5" and insert --0.05--.

Signed and Sealed this

Twentieth Day of February, 2007

JON W. DUDAS
*Director of the United States Patent and Trademark Office*